(12) United States Patent
Meng et al.

(10) Patent No.: US 11,169,316 B2
(45) Date of Patent: Nov. 9, 2021

(54) DISPLAY PANEL, DISPLAY DEVICE AND DRIVING METHOD FOR DRIVING A DISPLAY PANEL

(71) Applicant: BOE TECHNOLOGY GROUP CO., LTD., Beijing (CN)

(72) Inventors: Xiandong Meng, Beijing (CN); Wei Wang, Beijing (CN); Xianqin Meng, Beijing (CN); Jifeng Tan, Beijing (CN); Qiuyu Ling, Beijing (CN); Fangzhou Wang, Beijing (CN); Xiaochuan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/641,776

(22) PCT Filed: Mar. 21, 2019

(86) PCT No.: PCT/CN2019/078951
§ 371 (c)(1),
(2) Date: Feb. 25, 2020

(87) PCT Pub. No.: WO2020/186492
PCT Pub. Date: Sep. 24, 2020

(65) Prior Publication Data
US 2021/0026057 A1    Jan. 28, 2021

(51) Int. Cl.
*G02F 1/1335* (2006.01)
*F21V 8/00* (2006.01)
*G02F 1/13357* (2006.01)

(52) U.S. Cl.
CPC ........... *G02B 6/005* (2013.01); *G02B 6/0031* (2013.01); *G02F 1/13362* (2013.01);
(Continued)

(58) Field of Classification Search
CPC . G02B 6/0031; G02B 6/005; G02F 1/133528; G02F 1/133524; F21V 17/00; F21V 2200/00; B29D 11/00663
See application file for complete search history.

(56) References Cited

U.S. PATENT DOCUMENTS

| | | | |
|---|---|---|---|
| 2004/0135942 A1* | 7/2004 | Lee | G02F 1/133615 349/113 |
| 2005/0018301 A1* | 1/2005 | Uehara | G02B 5/288 359/586 |

(Continued)

FOREIGN PATENT DOCUMENTS

| | | |
|---|---|---|
| CN | 101520565 A | 9/2009 |
| CN | 103105708 A | 5/2013 |

(Continued)

*Primary Examiner* — Mariam Qureshi
(74) *Attorney, Agent, or Firm* — The Webb Law Firm

(57) ABSTRACT

The present disclosure relates to a display panel. The display panel includes: a light guide member, a light extraction member and a modulation member sequentially arranged along a first direction; and wherein the light extraction member is configured to extract light propagating within the light guide member in a collimated manner to one side of the light extraction member away from the light guide member, and the modulation member is configured to modulate a reflectance and transmittance of the light extracted in a collimated manner by the light extraction member within the modulation member.

16 Claims, 3 Drawing Sheets

(52) U.S. Cl.
CPC .. *G02F 1/133512* (2013.01); *G02F 1/133514* (2013.01); *G02F 1/133528* (2013.01); *G02F 1/133616* (2021.01); *G02F 2203/30* (2013.01)

(56) References Cited

U.S. PATENT DOCUMENTS

| | | | |
|---|---|---|---|
| 2007/0263139 A1* | 11/2007 | Hwang | G02B 6/0056 349/96 |
| 2008/0252816 A1* | 10/2008 | Hwang | G02B 6/0038 349/64 |
| 2015/0009450 A1 | 1/2015 | Xiong | |
| 2018/0164490 A1* | 6/2018 | Ma | G02B 30/26 |
| 2018/0188440 A1* | 7/2018 | Fattal | G02B 1/12 |
| 2018/0196302 A1* | 7/2018 | Bae | G02F 1/133509 |
| 2019/0285935 A1 | 9/2019 | Tan | |

FOREIGN PATENT DOCUMENTS

| | | |
|---|---|---|
| CN | 103293760 A | 9/2013 |
| CN | 107238974 A | 10/2017 |
| CN | 108415191 A | 8/2018 |
| CN | 108710226 A | 10/2018 |
| WO | 2018215784 A1 | 11/2018 |

\* cited by examiner

DISPLAY PANEL, DISPLAY DEVICE AND DRIVING METHOD FOR DRIVING A DISPLAY PANEL

CROSS-REFERENCE TO RELATED APPLICATIONS

The present application is a U.S. National Stage Application under 35 U.S.C. § 371 of International Patent Application No. PCT/CN2019/078951, filed on Mar. 21, 2019, the disclosure of which is incorporated by reference herein in its entirety.

TECHNICAL FIELD

The present disclosure relates to the field of display, and in particular to a display panel, a display device and a driving method for driving a display panel.

BACKGROUND

The display panel for use in a transparent display device which has a certain light transmittance, can display a background image behind the display panel, and at the same time can also actively display a setting screen, so that it can be widely applied in fields such as architectural windows and human-computer interaction to achieve more abundant display functions.

In the related art of a transparent display device, some display devices guide light from the light source into a light guide plate, so that the light is transmitted by total reflection within the light guide plate. A patterned light extracting grating is provided on the upper surface of the light guide plate, so as to extract the large-angle light transmitted by total reflection within the light guide plate at a collimation angle, thereby realizing a collimated light source with high transmittance. Moreover, a light shielding layer array is provided on the upper side of the light extraction grating, and the extracted light is absorbed by a black matrix (BM) to realize a display dark state. When a display bright state needs to be achieved, a liquid crystal grating is formed by applying a voltage to a liquid crystal layer on the upper side of the light shielding layer, so that the extracted light exits after diffraction by the liquid crystal grating. By applying different voltage signals to the liquid crystal layer, it is possible to implement that the liquid crystal grating has different diffractive frequencies for the extracted light to realize multi-gray scale display.

SUMMARY

According to one aspect of the present disclosure, a display panel is provided. The display panel includes: a light guide member, a light extraction member and a modulation member sequentially arranged along a first direction; and wherein the light extraction member is configured to extract light propagating within the light guide member in a collimated manner to one side of the light extraction member away from the light guide member, and the modulation member is configured to modulate a reflectance and transmittance of the light extracted in a collimated manner by the light extraction member within the modulation member.

In some embodiments, the modulation member includes: a first electrode layer and a second electrode layer that are oppositely arranged; a liquid crystal layer located between the first electrode layer and the second electrode layer; a first film layer located on one side of the first electrode layer away from the liquid crystal layer; and a second film layer located on one side of the second electrode layer away from the liquid crystal layer; wherein the first film layer, the liquid crystal layer, and the second film layer constitute an optical resonant cavity.

In some embodiments, a material of the first film layer is silver or aluminum, and a material of the second film layer is silver or aluminum.

In some embodiments, the light extraction member includes: a light extraction grating adjacent to the light guide member and completely covering a surface of one side of the light guide member adjacent to the light extraction grating.

In some embodiments, the light extraction member includes: a first transparent material layer; wherein the light extraction grating is located within the first transparent material layer; a material of the light extraction grating has a refractive index higher than that of a material of the light guide member, and a material of the first transparent material layer has a refractive index lower than that of the material of the light guide member.

In some embodiments, the display panel further includes: a second transparent material layer located on one side of the light guide member away from the first transparent material layer and adjacent to the light guide member; and wherein a material of the second transparent material layer has a refractive index lower than that of the material of the light guide member.

In some embodiments, the display panel further includes: a light source assembly, located on one side of the light guide member along a second direction, and configured to provide the light guide member with a first polarized light, wherein a vibration direction of the first polarized light is parallel to a deflection plane of liquid crystal molecules of the liquid crystal layer, and the second direction is perpendicular to the first direction.

In some embodiments, the light source assembly includes: a curved reflecting member; a monochromatic light source located at a focal point of the curved reflecting member; and a first polarizing layer located between the curved reflecting member and the light guide member; wherein the curved reflecting member is configured to reflect a first light from the monochromatic light source into the light guide member, and the first polarizing layer is configured to transmit a first polarized light of the first light.

In some embodiments, a light emitting direction of the display panel is parallel to and in the same direction as the first direction.

In some embodiments, the display panel further includes: a second polarizing layer located on one side of the light guide member away from the light extraction member, and configured to transmit a second polarized light of a second light from one side of the second polarizing layer away from the light guide member, and wherein a polarization direction of the second polarized light is perpendicular to a deflection plane of liquid crystal molecules of the liquid crystal layer.

In some embodiments, the display panel further includes: a substrate located on one side of the modulation member away from the light guide member; and a color filter layer located on one side of the substrate away from the modulation member.

In some embodiments, the light extraction member includes a tilted grating.

In some embodiments, a light emitting direction of the display panel is parallel to and opposite to the first direction.

In some embodiments, the display panel further includes: a third polarizing layer, located on one side of the modulation member away from the light extraction member, and configured to absorb light incident into the third polarizing layer from the modulation member and transmit a second polarized light of a second light from one side of the third polarizing layer away from the light guide member, and wherein a polarization direction of the second polarized light is perpendicular to a deflection plane of liquid crystal molecules of the liquid crystal layer.

In some embodiments, the display panel further includes: a color filter layer located on one side of the light guide member away from the light extraction member.

In some embodiments, the display panel further includes: a substrate located on one side of the modulation member away from the light guide member; and a light absorbing layer, located on one side of the substrate away from the light extraction member, and configured to absorb light incident into the light absorbing layer from the modulation member.

In some embodiments, the display panel further includes: a light source assembly, located on one side of the light guide member along an extending direction of the light guide member, and configured to provide the light guide member with a first polarized light, wherein a vibration direction of the first polarized light is parallel to a deflection plane of liquid crystal molecules of the liquid crystal layer; and wherein the light extraction grating is configured to gradually increase a diffraction efficiency from one end adjacent to the light source assembly to one end away from the light source assembly along a second direction which is perpendicular to the first direction.

According to one aspect of the present disclosure, a display device is provided. The display device includes the aforementioned display panel.

According to one aspect of the present disclosure, a driving method for driving the display panel is provided. The driving method includes: in response to a step that the display panel receives a display signal, modulating the reflectance and transmittance of the light extracted in a collimated manner by the light extraction member within the modulation member by the modulation member, so that the display panel presents a display state corresponding to the display signal.

BRIEF DESCRIPTION OF THE DRAWINGS

The accompanying drawings, which constitute part of this specification, illustrate exemplary embodiments of the present disclosure, and together with this specification, serve to explain the principles of the present disclosure.

The present disclosure can be more clearly understood from the following detailed description with reference to the accompanying drawings, in which.

Figure 1:
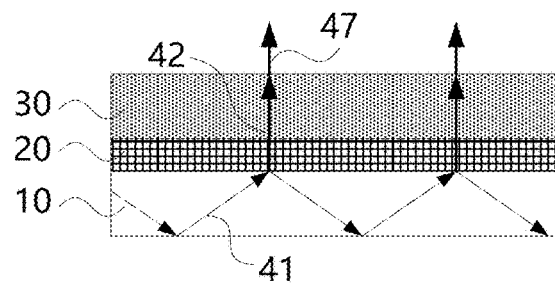
FIGS. 1 and 2 are respectively schematic views of principles of achieving transmission and reflection of light which is extracted in a collimated manner according to some embodiments of the display panel of the present disclosure.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure can be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word similar to "comprise/include" or "contain" means that the element before the word covers the element(s) listed after the word without excluding the possibility of also covering other elements. The terms "up", "down", "left", "right", or the like are used only to represent a relative positional relationship, and the relative positional relationship can be changed correspondingly if the absolute position of the described object changes.

In the present disclosure, when it is described that a particular device is located between the first device and the second device, there can be an intermediate device between the particular device and the first device or the second device, and alternatively, there can be no intermediate device. When it is described that a particular device is connected to other devices, the particular device can be directly connected to the other devices without an intermediate device, and alternatively, cannot be directly connected to the other devices but with an intermediate device.

All the terms (including technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art cannot be discussed in detail, but where appropriate, these techniques, methods, and apparatuses should be considered as part of this specification.

After research, the inventors have found that, in the display device in the related art, it is necessary to provide a patterned extracting grating on the upper surface of the light guide plate by an etching process, and it is also necessary to ensure that the surface of the non-light-extracting area of the light guide plate is not etched, which are very difficult.

In order to ensure a display dark state of the display device, it is necessary to accurately correspond the BM located on the upper layer to the patterned light extraction port of the extracting grating located on the lower layer so as to avoid a dark state light leakage phenomenon. However, the accurate correspondence can increase the process difficulty, and enlarging the width of the BM to evade a dark state light leakage will also cause a great loss of the light efficiency of the liquid crystal. For example, in some display devices of the related art, 97% of the light is absorbed by the BM, while the light efficiency of the liquid crystal is only 3%. In addition, the area ratio of the patterned light extraction port is very small. As a result, light can only be transmitted by internal total reflection at the position on the light guide plate where the light extraction port is not designed, but not be extracted for utilization, thereby further resulting a low light efficiency of the display device.

In view of this, the embodiments of the present disclosure provide a display panel capable of improving the light efficiency of display.

Figure 2:
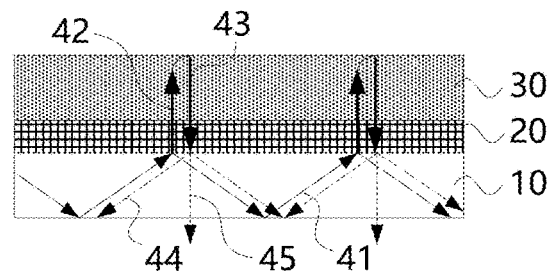

FIGS. 1 and 2 are respectively schematic views of principles of achieving transmission and reflection of light which is extracted in a collimated manner according to some embodiments of the display panel of the present disclosure.

Referring to FIGS. 1 and 2, in some embodiments, the display panel includes: a light guide member 10, a light extraction member 20, and a modulation member 30 that are sequentially arranged along a first direction. In FIGS. 1 and 2, the first direction is a vertically upward direction. The first direction is parallel to a final light emitting direction of the display panel. The light guide member 10 can propagate the light incident into the light guide member 10 by total reflection. The light guide member 10 can be made from a material with a flat surface and a high transparency, such as glass and polymethyl methacrylate that are often used for the materials of the upper and lower substrates of the thin film transistor liquid crystal display screen.

The light propagating within the light guide member 10 can be extracted through the light extraction member 20. The light extraction member 20 is configured to extract light propagating within the light guide member 10 in a collimated manner to one side of the light extraction member 20 away from the light guide member 10.

The modulation member 30 is located on one side of the light extraction member 20 away from the light guide member 10. The modulation member can modulate the reflectance and transmittance of the light extracted in a collimated manner by the light extraction member within the modulation member. In order to realize the modulation function, the modulation member 30 can constitute an optical resonant cavity. The optical resonant cavity refers to a cavity structure, such as a Fabry-Perot resonant cavity, in which the light wave can be reflected back and forth to provide optical energy feedback. The refractive index of the intra-cavity medium of the optical resonant cavity can be adjusted so that the modulation member can modulate the reflectance and transmittance of the light extracted in a collimated manner by the light extraction member within the modulation member.

By changing the reflectance and transmittance of the modulation member 30 over the light extracted in a collimated manner by the light extraction member 20 within the modulation member, the light can be transmitted and reflected to different extents, thereby realizing modulation of a display dark state, a display bright state, and multiple gray-scales between the display dark state and the display bright state of the display panel. In the embodiments of the present disclosure, the display dark state means that the display panel is in a state where the light emitting brightness is lowest, and the display bright state means that the display panel is in a state where the light emitting brightness is highest. In the present embodiment, the display panel structure can be applied to multiple display modes such as transparent display, reflective transparent display, and opaque display.

Compared with the manner of controlling the diffraction efficiency of the liquid crystal grating and absorbing the collimated emitting light using BM to achieve modulation of a display dark state, a display bright state, and multiple gray levels of the display panel in the related art, the embodiments of the present disclosure which employ different implementation principles can omit the provision of BM, thereby eliminating the influence of BM on the display light effect and improving the display light effect of the display panel. Correspondingly, the embodiments of the present disclosure also avoid the process difficulty when BM is prepared.

In FIG. 1, the light 41 propagating by total reflection within the light guide member 10 can be extracted by the light extraction member 20 in a collimated manner and incident on the modulation member 30. For the modulation member 30 constituting the optical resonant cavity, by adjusting a refractive index of the intra-cavity medium of the optical resonant cavity, the reflectance and transmittance of the modulation member 30 over the light 42 extracted in a collimated manner by the light extraction member 20 within the modulation member can be changed to reduce the reflectance and increase the transmittance, so that the light 42 can be transmitted along the first direction through the modulation member 30, and the light 47 transmitted from the modulation member 30 can be further obtained on one side of the modulation member 30 away from the light guide member 10.

In FIG. 2, the light 41 propagating by total reflection within the light guide member 10 can be extracted in a collimated manner by the light extraction member 20 and incident on the modulation member 30. For the modulation member 30 constituting the optical resonant cavity, by adjusting the refractive index of the intra-cavity medium of the optical resonant cavity, the reflectance and transmittance of the modulation member 30 over the light 42 extracted in a collimated manner by the light extraction member 20 can be changed to increase the reflectance and reduce the transmittance, so that the light 42 is not transmitted through the modulation member 30 along the first direction, but is reflected toward the light extraction member 20 along an opposite direction of the first direction, and the reflected light 43 returns to the light guide member 10 through the light extraction member 20. According to the design of the light extraction member 20 and the light guide member 10, a part of the light 44 returning to the light guide member 10 can continue to propagate within the light guide member 10 by total reflection, and another part of the light 45 can pass through the light guide member 10 and reach one side of the light guide member 10 away from the light extraction member 20. In this way, the light transmitted from the modulation member 30 cannot be obtained on one side of the modulation member 30 away from the light guide member 10.

In some embodiments, the light extraction member 20 and the light guide member 10 can be designed so that the light returning to the light guide member 10 is the light 44 that continues to propagate within the light guide member 10 by total reflection, thereby implementing light recycling and further reducing the loss of light efficiency. In other embodiments, the light extraction member 20 and the light guide member 10 can also be designed so that the light returning to the light guide member 10 is the light 47 passing through the light guide member 10 and reaching one side of the light guide member 10 away from the light extraction member 20, so as to achieve the application such as reflective display.

For ease of understanding, the solid lines and the dotted lines with arrows are used to schematically represent the light transmission path in FIG. 1 and FIG. 2, which should not be understood as an actual light transmission process. In addition, in order to implement the relationship between the light 42 incident on the modulation member 20 and the light 43 reflected by the modulation member 20, the two light rays are not drawn on the same straight line in FIG. 2, but connected by a connecting line for reference.

Figure 3:
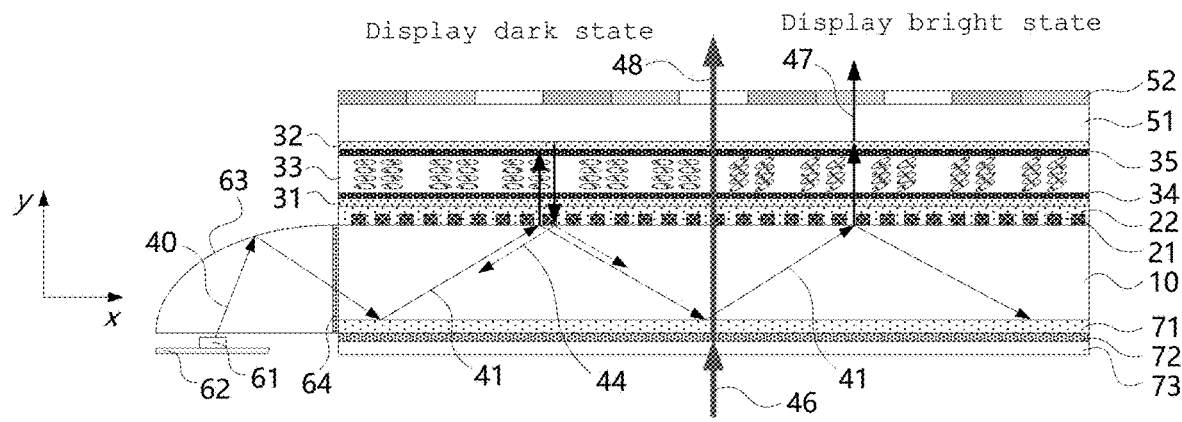
FIG. 3 is a schematic view of a comparison between a display dark state and a display bright state respectively according to an embodiment of the display panel of the present disclosure.

FIG. 3 is a schematic view of comparison between a display dark state and a display bright state respectively according to an embodiment of the display panel of the present disclosure.

Referring to FIG. 3, in some embodiments, the light extraction member 20 includes a first transparent material layer 22 and a light extraction grating 21. A light extraction grating 21 (e.g., a micro/nano grating or the like) is located within the first transparent material layer 22 and adjacent to the light guide member 10. The light extraction grating 21 can extract upward the light 41 propagating within the light guide member 10 in a collimated manner by a diffractive effect to form a collimated light extraction effect.

The first transparent material layer 22 which can be adjacent to the light guide member 10 and the modulation member 30 respectively, is configured to planarize the light extraction grating 21 so as to achieve the effect of supporting the modulation member 30. The material of the first transparent material layer 22 can be an organic transparent resin or the like, which has a refractive index lower than that of the material of the light guide member 10 so as to reduce the effect over the collimated extraction light. During preparation, it is possible to first prepare the light extraction grating 21 on the surface of the light guide member 10, and then fill the transparent material into the light extraction grating 21 to form a first transparent material layer 22, so that the light extraction grating 21 is located within the first transparent material layer 22 and adjacent to the light guide member 10.

In addition, referring to FIG. 3, a second transparent material layer 71 can be adjacently provided on one side of the light guide member 10 away from the first transparent material layer 22. The refractive index of the material of the second transparent material layer 71 located on both sides of the light guide member and the refractive index of the material of the first transparent material layer 22 are both lower than the refractive index of the material of the light guide member, thereby effectively ensuring propagation of the light inside the light guide member 10 by total reflection.

In some embodiments, the light extraction grating 21 completely covers a surface of one side of the light guide member 10 adjacent to the light extraction grating 21. Different from the patterned extraction grating in the related art, the light extraction grating 21 of the present embodiments is a grating structure having an entire grating surface. The grating structure completely covers the surface of the light guide member 10 on one side adjacent to the light extraction grating 21 so that the light within the light guide member e can be basically employed by extraction when passing through the surface of the side, thereby improving the extraction efficiency and further improve the light efficiency. In addition, in terms of processing, since the light extraction grating 21 of the present embodiment is a grating structure having an entire grating surface, it can be prepared by using other manufacturing processes (e.g. interference exposure or nano-imprinting) without considering patterned manufacturing, so that it is possible to avoid the process difficulty in maintaining that the non-light extraction area on the surface of the light guide member is not etched, and BM accurately corresponds to the patterned light extraction port when the patterned light extraction port is etched in the related art.

Referring to FIG. 3, in some embodiments, the modulation member 30 includes: a first electrode layer 34, a second electrode layer 35, a liquid crystal layer 33, a first film layer 31, and a second film layer 32. The first electrode layer 34 and the second electrode layer 35 are oppositely arranged. The liquid crystal layer 3 is located between the first electrode layer 34 and the second electrode layer 35, and when different voltages are applied to the first electrode layer 34 and the second electrode layer 35, it is possible to cause a change in the equivalent refractive index of the liquid crystal layer 33.

The first film layer 31 is located on one side of the first electrode layer 34 away from the liquid crystal layer 33. The second film layer 32 is located on one side of the second electrode layer 35 away from the liquid crystal layer 33. The first film layer 31, the liquid crystal layer 33, and the second film layer 32 can constitute an optical resonant cavity. In some embodiments, the material of the first film layer 31 constituting the optical resonant cavity can be silver (Ag), aluminum (Al) or a composite material such as silicon nitride ($Si_3N_4$) or silicon oxide ($SiO_2$), and the material of the second film layer 32 can be silver (Ag), aluminum (Al) or a composite material such as silicon nitride ($Si_3N_4$) or silicon oxide ($SiO_2$). The first film layer 31 and the second film layer 32 can be made of the same material or different materials according to actual needs.

The liquid crystal in the liquid crystal layer 33 is an intra-cavity medium of the optical resonant cavity, with an equivalent refractive index which can be changed under the effect of a driving voltage of the first electrode layer 34 and the second electrode layer 35. The change in the equivalent refractive index of the liquid crystal corresponds to the change in the cavity length of the optical resonant cavity, and the change in the cavity length changes the transmittance and reflectance of the optical resonant cavity correspondingly. In this way, the ratio of light transmitted and reflected through the modulation member 30 can be controlled, thereby realizing a display bright state, a display dark state, and different gray scales in different display applications.

In some embodiments, the liquid crystal layer can be made from a liquid crystal material with a high refractive index difference to increase the number of gray scales. In other embodiments, the intra-cavity material in the optical resonant cavity of the modulation member 30 is not limited to a liquid crystal material, and other materials with a variable refractive index can also be used.

Referring to FIG. 3, in some embodiments, the display panel further includes a substrate 51. The substrate 51 is located on one side of the modulation member away from the light guide member. In FIG. 3, the first direction is a vertically upward direction, while the light emitting direction of the display panel is parallel to and in the same direction as the first direction. The display panel of such structure can be applied to transparent display.

In FIG. 3, a first film layer 31 is located between the first electrode layer 34 and the first transparent material layer 22. The second film layer 32 is located between the second electrode layer 35 and the substrate 51. The substrate 51 can be adjacent to the second film layer 32. When the second film layer 32 is prepared, the second film layer 32 can be formed on the substrate 51.

In addition, the display panel can further include a color filter layer 52 located on one side of the substrate 51 away from the modulation member 30. The color filter layer 52 can be implemented by using a quantum dot color filter (QD-CF). By the color filter layer 52 cooperating with the modulation member 30 to control the transmittance of light, it is possible to satisfy display of different colors and different gray scales by the display panel. In other embodiments, the display panel cannot include a color filter layer either.

Considering that the light extraction grating and the optical resonant cavity are relatively sensitive to the wavelength and vibration direction of light respectively, in some embodiments, the display panel further includes: a light source assembly. The light source assembly is located on one side of the light guide member 10 along the second direction, and is configured to provide the light guide member 10 with a first polarized light. The second direction is perpendicular to the first direction. In FIG. 3, the second direction can be horizontally leftward or horizontally rightward. The vibration direction of the first polarized light is parallel to the deflection plane of the liquid crystal molecules of the liquid crystal layer; thus, the first polarized light can be modulated by the optical resonant cavity constituted by the modulation member 30. That is, reflectance and transmittance of the modulation member 30 with respect to the first polarized light are modulatable.

In FIG. 3, the light source assembly includes: a curved reflecting member 63, a monochromatic light source 61, and a first polarizing layer 64. The monochromatic light source 61 can use a monochromatic light emitting diode (LED). In order to ensure a sufficiently high degree of collimation, the size of the monochromatic LED is minimized. For example, a micro-LED or a micro organic light emitting diode (micro-OLED) is used. In other embodiments, the monochromatic light source 61 can also be a laser light source.

The monochromatic light source 61 is located at a focal point of the curved reflecting member 63. The curved reflecting member 63 can include a parabolic reflector, a spherical reflector, or the like. As some examples, the material of the curved reflecting member 63 can include a resin such as polymethyl methacrylate or the like. The curved reflecting member 63 can reflect the first light 40 from the monochromatic light source 61 into the light guide member 10.

The first polarizing layer 64 is located between the curved reflecting member 63 and the light guide member 10. The first polarizing layer 64 can transmit the first polarized light of the first light 40. In this way, the first polarized light of the first light 40 can be modulated by the modulation member 30, thus realizing a display dark state, a display bright state, and different gray scales.

In addition, a second polarizing layer 72 can be further provided on one side of the light guide member 10 away from the light extraction member 20 in FIG. 3. The second polarizing layer 72 can transmit the second polarized light 48 of the second light 46 from one side of the second polarizing layer 72 away from the light guide member 10. The polarization direction of the second polarized light is perpendicular to the deflection plane of the liquid crystal molecules of the liquid crystal layer 33.

Since the polarization direction of the second polarized light is perpendicular to the deflection plane of the liquid crystal molecules of the liquid crystal layer, the reflectance and transmittance of the second polarized light 48 within the modulation member cannot be modulated by the modulation member. The second polarizing layer 72 can be a polarizer with a lower haze or a wire grid polarizer (WGP). In this way, when the embodiments of the present disclosure are applied to a transparent display (e.g. an augmented virtual reality display), when ambient light on one side of the second polarizing layer 72 away from the light guide member 10 is filtered to the second polarized light 48, the second polarized light 48 cannot be modulated by the modulation member 30, thereby reducing or avoiding mutual interference between ambient light and the first polarized light for gray scale display, thereby achieving a transparent display.

It should be further explained that, the first light refers to light from the monochromatic light source 61, and the second light refers to light (e.g. ambient light) from one side of the second polarizing layer 72 away from the light guide member 10. By means of the display panel structure of the present embodiment, it is possible to allow the second light (e.g., ambient light) is emitted through the white pixel of the display panel. When the second light (e.g., ambient light) is converted into the second polarized light through the second polarizing layer, the brightness of the second light is reduced, thereby weakening the brightness influence of the second light on the screen displayed in the display panel.

In order to protect the structure of the display panel so that it is not easily worn and damaged, referring to FIG. 3, the display panel can further include a protective layer 73. The protective layer 73 can be located on one side of the second polarizing layer 72 away from the light guide member 10, and can be made from a hard transparent material, such as glass.

For the embodiments in which the light source assembly described above is used, the light extraction grating 21 can be configured to gradually increase the diffraction efficiency from one end adjacent to the light source assembly to one end away from the light source assembly along a second direction. That is, there is a strong light on one side within the light guide member 10 adjacent to the light source assembly, with a relatively small grating diffraction efficiency correspondingly, while there is a weak light on one side within the guide member 10 away from the light source assembly, with a relatively large grating diffraction efficiency correspondingly, thereby making a more uniform light extraction by the light extraction grating 21.

For ease of the understanding, the light path conditions of the display panel in a display dark state and a display bright state are shown on the left and right sides of FIG. 3 respectively. The monochromatic light source 61 can be disposed on the printed circuit board 62, and the light 40 emitted by the light source 61 is collimated and coupled into the light guide member 10 at a specific angle inside the reflective lamp cover 63, and is propagated within the light guide member 10 by total reflection in the form of the first polarized light (i.e., the light 41 in FIG. 3) after passing through the first polarizing layer 64.

The light extraction grating 21 extracts the light on the upper surface of the light guide member 10 in a collimated manner. The driving voltage of the liquid crystal layer is controlled to adjust the transmittance and reflectance of the optical resonant cavity constituted by the modulation member. When the reflectance of the modulation member 30 is adjusted to a maximum, the light incident on the modulation member 30 is reflected back to the light extraction grating 21, with no or only a small amount of light transmitted through the modulation member 30, thereby achieving a dark state display (left side of FIG. 3). According to the reversible characteristics of the optical path of the light extraction grating, the light reflected back to the light extraction grating 21 can be coupled into the light guide member 10 again through the light extraction grating 21 and be propagated in the light guide member 10 by total reflection, thereby realizing recycling of the light and improving the light energy utilization rate.

In the present embodiment, the light extraction grating 21 can be a step grating. In other embodiments, in order to further reduce the loss of the 0th order diffracted light generated by the light extraction grating 21 being emitted from the light guide member 10 vertically, the light extraction member can include a tilted grating. That is, the tilted grating is used as the light extraction grating 21. The step structure of the tilted grating is tilted at a specific angle. Since the tilted grating utilizes the characteristics of Bragg matching, its main energy is concentrated on effective +1st and −1st orders with less energy in 0th order, so that it is possible to reduce the loss of 0th order diffracted light and improve the efficiency of light energy utilization. In other embodiments, the light extraction grating 21 can also be a holographic grating.

By adjusting the driving voltage of the liquid crystal layer, the equivalent refractive index of the liquid crystal within the liquid crystal layer is adjusted so that there is a change in the transmittance and reflectance of the modulation member 30 over the first polarized light within the modulation member 30. When the transmittance of the modulation member 30 is adjusted to a maximum, the light incident on the modulation member 30 is transmitted through the modulation member 30, with no or only a small amount of light reflected back to the light extraction grating 21, thereby achieving a bright display state (right side of FIG. 3). FIG. 3 also schematically shows different deflection angles of the liquid crystal molecules in the display dark state and the display bright state under different driving voltages.

Figure 4:
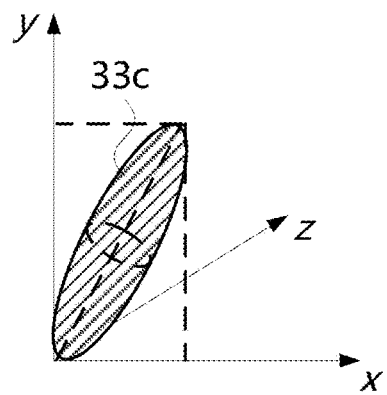
FIG. 4 is a schematic view of deflection of liquid crystal molecules according to an embodiment of the display panel of the present disclosure.

FIG. 4 is a schematic view of deflection of liquid crystal molecules according to an embodiment of the display panel of the present disclosure.

Referring to FIGS. 3 and 4, when different driving voltages are applied to the liquid crystal layer, the liquid crystal molecules 33c can be deflected in the xy plane, which is the deflection plane of the liquid crystal. The vibration direction of the first polarized light extracted in a collimated manner by the light extraction grating 21 is parallel to the xy plane, so that a gray scale modulation can be achieved by the modulation member 30. For the second polarized light 48 passing through the second polarizing layer 72, its vibration direction is perpendicular to the xy plane. When a voltage is applied to the liquid crystal layer, the equivalent refractive index of the liquid crystal is always equal to the short-axis refractive index of the liquid crystal molecules 33c, thus the optical resonant cavity cannot modulate the second polarized light 48, thereby achieving a transparent display.

Figure 5:
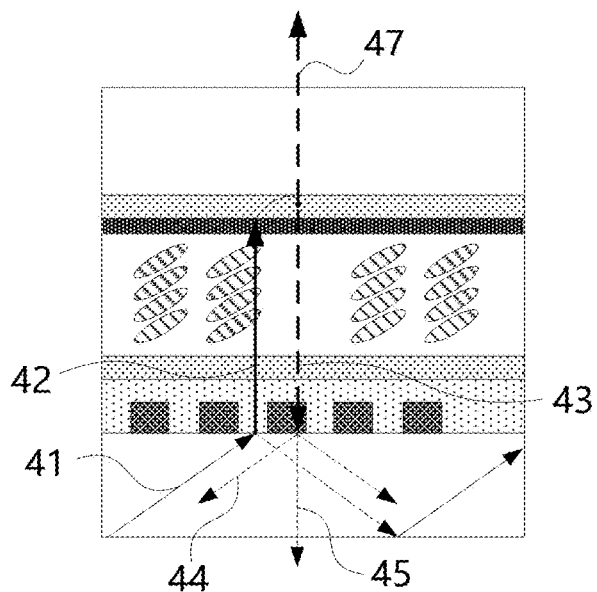
FIG. 5 is a schematic view of light transmission according to an embodiment of the display panel of the present disclosure.

FIG. 5 is a schematic view of light propagation according to an embodiment of the display panel of the present disclosure.

Referring to FIG. 5, for a display intermediate state between the display dark state and the display bright state, the light extraction grating extracts upward the light 41 propagating by total reflection within the light guide member in a collimated manner. When the extracted light 42 is under the action of the liquid crystal layer driven by voltage, part of the light 47 is transmitted upward, and part of the light 43 is reflected back downward to the light extraction grating. By adjusting the respective amounts of the transmitted light 47 and the reflected light 43, the display intermediate states having different gray scales can be achieved.

According to different application scenarios of the display panel, the light extraction grating can be configured to partially or fully couple the returned light 43 into the light guide member to continue transmission by total reflection (i.e., light 44 in FIG. 5), or can be configured to partially or fully transmit the returned light 43 through the light guide member (i.e., the light 45 in FIG. 5).

Figure 6:
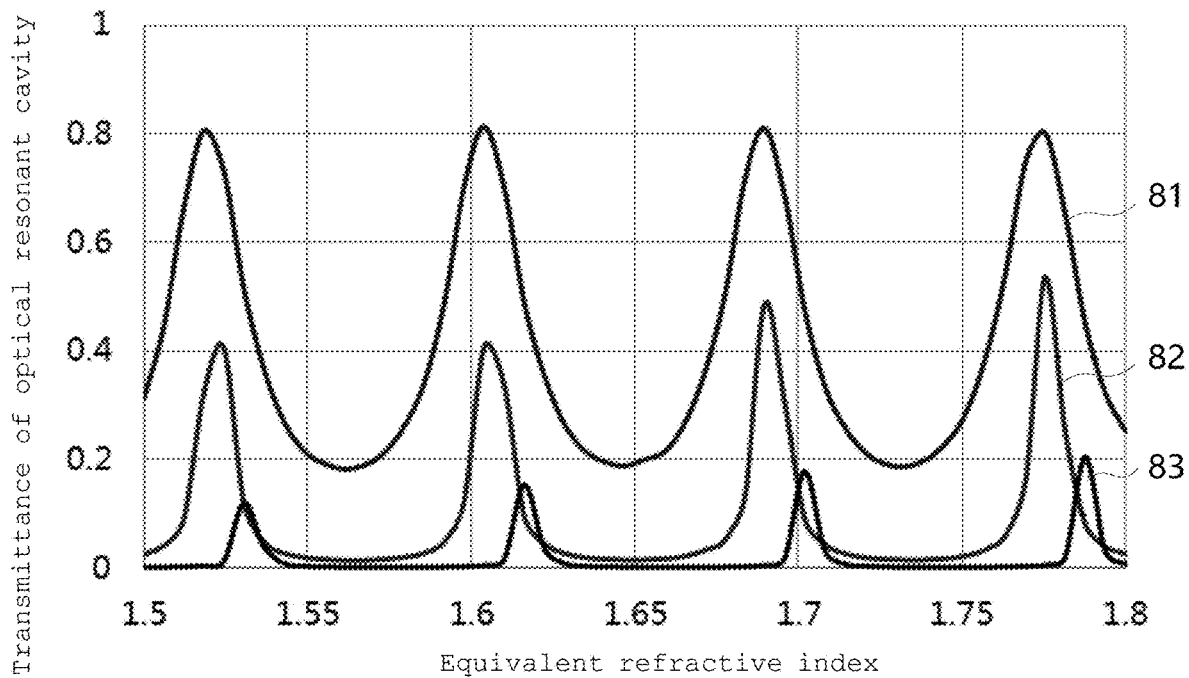
FIG. 6 is a simulation graph of transmittance of an optical resonant cavity under different film thicknesses according to some embodiments of the display panel of the present disclosure.

FIG. 6 is a simulation graph of transmittance of an optical resonant cavity under different film thicknesses according to some embodiments of the display panel of the present disclosure.

In FIG. 6, the curve 81 corresponds to an embodiment in which the first film layer and the second film layer are both 50 nm thick Ag films. When the liquid crystal layer is under the action of different driving voltages, the horizontal axis represents the equivalent refractive index of the corresponding liquid crystal cell, and the different equivalent refractive indexes correspond to the transmittances of different optical resonant cavities in the curve 81. It can be seen from FIG. 6 that, when some equivalent refractive indexes correspond to the peak values of the transmittance of the optical resonant cavity, some equivalent refractive indexes correspond to a transmittance of 0 or almost 0. In addition, there is a transition between the peak of the equivalent refractive index and 0 which can implement changing the gray scales.

The curve 82 corresponds to an embodiment in which the first film layer and the second film layer are both 35 nm thick Ag film, and the curve 83 corresponds to an embodiment in which the first film layer and the second film layer are both 15 nm thick Ag film. The transmittance of the optical resonant cavity corresponding to these two curves varies in a manner similar to the curve 81, but the optical resonant cavity of each curve has different transmittance peaks, and the corresponding reflection and transmission effects are different, so as to meet different display requirements. It can be seen from FIG. 6 that, the optical resonant cavity corresponding to the thin Ag film layer has a low transmittance peak, while the optical resonant cavity corresponding to the thick Ag film layer has a high transmittance peak.

Figure 7:
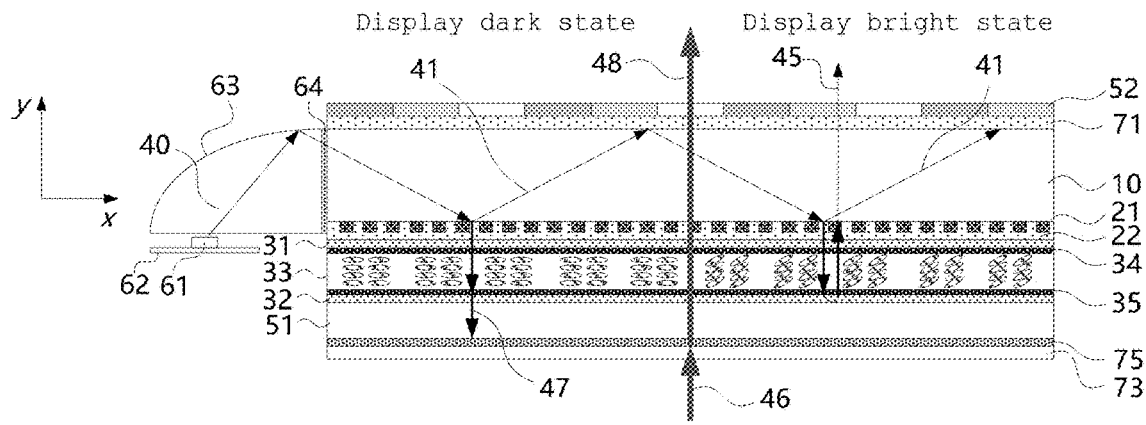
FIG. 7 is a schematic view of a comparison between a display dark state and a display bright state respectively according to another embodiment of the display panel of the present disclosure.

FIG. 7 is a schematic view of a comparison between a display dark state and a display bright state respectively according to another embodiment of the display panel of the present disclosure.

Compared with the foregoing embodiment, the light emitting direction of the display panel shown in FIG. 7 is parallel to and opposite to the first direction. In FIG. 7, the first direction is vertically downward, while the light emitting direction of the display panel is vertically upward. The display panel having such structure can be applied to reflective transparent display.

Referring to FIG. 7, in some embodiments, the substrate 51 is located on one side of the modulation member 30 away from the light guide member 10. The display panel can further include a color filter layer 52. The position of the color filter layer 52 is provided on one side of the substrate 51 away from the modulation member 30. In FIG. 7, a second transparent material layer 71 can be further provided between the color filter layer 52 and the light guide member 10. The material of the second transparent material layer has a refractive index lower than that of the light guide member 10 so as to ensure transmission of the light within the light guide member 10 by total reflection.

The light 41 collimated into the light guide member 10 at a specific angle can be extracted by the light extraction member 20 in a collimated manner to one side of the light extraction grating 21 away from the color filter layer 52 (i.e., a lower side of the light extraction grating 21 in FIG. 7). For the modulation member 30 constituting the optical resonant cavity, by adjusting the refractive index of the intra-cavity medium of the optical resonant cavity, it is possible to change the amount of transmission and reflection of the extracted light 42 within the modulation member 30.

For example, when different driving voltages are applied to the first electrode layer 34 and the second electrode layer 35, it is possible that there is a change in the reflectance and transmittance of the modulation member 30 over the light extracted in a collimated manner by the light extraction member 20 within the modulation member 30. When this transmittance is adjusted to a maximum, most of the light incident on the modulation member 30 is transmitted through the modulation member 30, with no or only a small amount of light reflected back to the optical extraction grating 21. The light 47 transmitted through the modulation member 30 can be absorbed by a light absorbing structure, such as BM. Since there is no or a small amount of light emitting from one side where the color filter layer 52 is located, a display dark state is realized (left side of FIG. 7).

When the reflectance is adjusted to a maximum, most of the light incident on the modulation member 30 is reflected back to the light extraction grating 21, with no or only a small amount of light transmitted through the modulation member 30. By designing the light extraction grating 21, the light reflected back to the light extraction grating 21 can vertically pass through the light guide member 10 and reach the color filter layer 52 using the 0th order reflection of the light extraction grating 21, thereby realizing the display bright state (right side of FIG. 7). FIG. 7 also schematically shows that deflection angles of the liquid crystal molecules in the display dark state and the display bright state are different under different driving voltages.

Referring to FIG. 7, in some embodiments, the display panel further includes a third polarizing layer 75. The third polarizing layer 75 which is located on one side of the modulation member 30 away from the light extraction member 20, is configured to absorb light incident on the third polarizing layer 75 from the modulation member 30 and transmit the second polarized light 48 of the second light 46 from one side of the third polarizing layer 75 away from the light guide member 10. The polarization direction of the second polarized light 48 is perpendicular to the deflection plane of the liquid crystal molecules of the liquid crystal layer 33. Since the polarization direction of the second polarized light 48 is perpendicular to the deflection plane of the liquid crystal molecules of the liquid crystal layer 33, the reflectance and transmittance of the second polarized light 48 cannot be modulated by the modulation member 30. The third polarizing layer 75 can be a polarizer.

In order to protect the structure of the display panel from being easily worn and damaged, referring to FIG. 7, the display panel can further include a protective layer 73. The protective layer 73 can be located on one side of the third polarizing layer 75 away from the light guide member 10, and can be made from a hard transparent material, such as glass.

In other embodiments, a light absorbing layer can be provided on one side of the modulation member away from the light extraction member. The light absorbing layer can absorb light incident on the light absorbing layer from the modulation member. In addition, it is possible to make the light absorbing layer itself opaque or provide other structures that are opaque on one side of the light absorbing layer away from the modulation member. The light absorbing layer can be BM, so that opaque display can be realized.

In the foregoing accompanying drawings, the solid lines and the dotted lines with arrows are also used to schematically represent a light transmission path, which should not be understood as an actual light transmission process. In addition, in order to reflect the relationship between the light 42 incident on the modulation member 20 and the light 43 reflected by and the light 47 transmitted through the modulation member 20, these lights are not drawn on the same straight line in some accompanying drawings, but connected by a connecting line for reference.

Various embodiments of the above-described display panel can be used for various display devices, and have application advantages especially in the fields such as augmented reality display, high-resolution display, 3D display, or near-eye display. Therefore, the present disclosure also provides an embodiment of a display device including the aforementioned display panel. The display device can be a mobile phone, a tablet computer, a television, a display, a notebook computer, a digital photo frame, a navigator, or any product or member having a display function.

Figure 8:
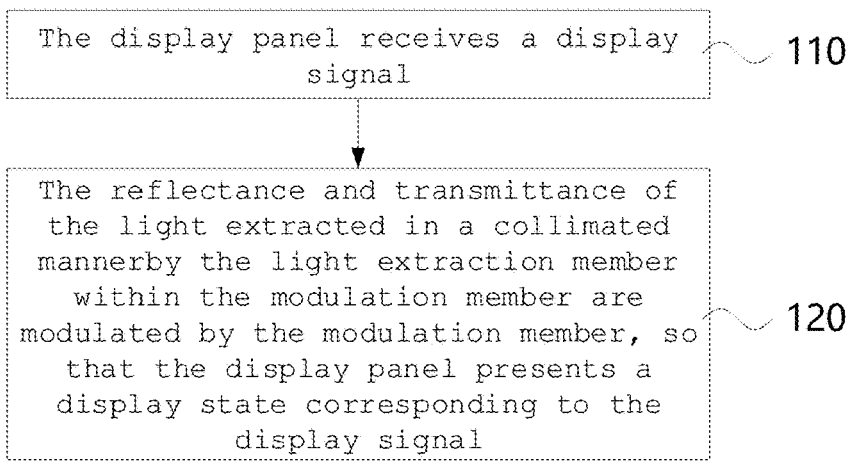
FIG. 8 is a schematic flowchart according to an embodiment of a method for driving the display panel of the present disclosure.

FIG. 8 is a schematic flowchart according to an embodiment of a method for driving the display panel of the present disclosure.

Referring to FIG. 8, in some embodiments, the display panel in the above-described embodiments can be driven by using the following driving method, which includes steps 110 and 120. In step 110, the display panel receives a display signal. In response to the step 110, in step 120, the reflectance and transmittance of the light extracted in a collimated manner by the light extraction member within the modulation member are modulated by the modulation member, so that the display panel presents a display state corresponding to the display signal. For the modulation member constituting the optical resonant cavity, the refractive index of the intra-cavity medium of the optical resonant cavity can be adjusted to modulate the reflectance and transmittance of the light extracted in a collimated manner by the light extraction member within the modulation member, so that the display panel presents a display state corresponding to the display signal. The display state includes at least one of a display bright state, a display dark state, and a plurality of intermediate states corresponding to different gray scales between the display bright state and the display dark state.

Taking the embodiment of the display panel shown in FIG. 3 as an example, when it is necessary to realize the display bright state of some pixels of the display panel, the driving voltages of the first electrode layer 34 and the second electrode layer 35 can be controlled according to the display signal to change the equivalent refractive index of the layer 33 so that the transmittance of the modulation member over the first polarized light is adjusted to a maximum. When it is necessary to realize the display dark state of some pixels of the display panel, the driving voltages of the first electrode layer 34 and the second electrode layer 35 can be controlled according to the display signal to change the equivalent refractive index of the layer 33 so that the reflectance of the modulation member over the first polarized light is adjusted to a maximum. When it is necessary to display the intermediate states having different gray scales, the driving voltages of the first electrode layer 34 and the second electrode layer 35 can be controlled according to the display signal to change the equivalent refractive index of the liquid crystal layer 33 so that the reflectance and transmittance of the modulation member over the first polarized light match the gray scale corresponding to the display signal.

Taking the embodiment of the display panel shown in FIG. 7 as another example, when it is necessary to realize the display bright state of some pixels of the display panel, the driving voltages of the first electrode layer 34 and the second electrode layer 35 can be controlled according to the display signal to change the equivalent refractive index of the layer 33 so that the reflectance of the modulation member over the first polarized light is adjusted to a maximum. When it is necessary to realize the display dark state of some pixels of the display panel, the driving voltages of the first electrode layer 34 and the second electrode layer 35 can be controlled according to the display signal to change the equivalent refractive index of the layer 33 so that the transmittance of the modulation member over the first polarized light is adjusted to a maximum. When it is necessary to display the intermediate states having different gray scales, the driving voltages of the first electrode layer 34 and the second electrode layer 35 can be controlled according to the display signal to change the equivalent refractive index of the liquid crystal layer 33 so that the reflectance and transmittance of the modulation member over the first polarized light match the gray scale corresponding to the display signal.

Figure 9:
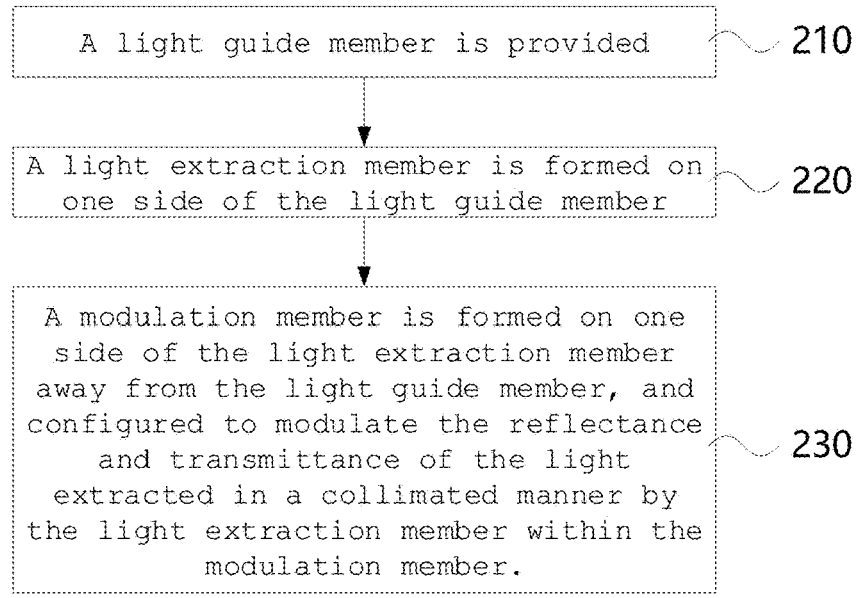
FIG. 9 is a schematic flowchart according to an embodiment of a method for manufacturing the display panel of the present disclosure.

FIG. 9 is a schematic flowchart according to an embodiment of a method for manufacturing the display panel of the present disclosure.

Referring to FIG. 9, in some embodiments, the display panel in the above-described embodiments can be prepared by using the following preparation method, which includes step 210, step 220, and step 230. In step 210, a light guide member is provided. In step 220, a light extraction member is formed on one side of the light guide member. The light extraction member is configured to extract the light propagating within the light guide member in a collimated manner to one side of the light extraction member away from the light guide member. In step 230, a modulation member is formed on one side of the light extraction member away from the light guide member. The modulation member is configured to modulate the reflectance and transmittance of the light extracted in a collimated manner by the light extraction member within the modulation member.

Multiple embodiments in the present description are described in a progressive manner, with different focuses for the respective embodiments which can be subjected to cross-reference for the same or similar portions. For the embodiments of the driving method and the preparation method, since the methods as a whole and the steps involved are in a relationship corresponding to the content in the embodiments of the display panel, such embodiments are described in a relatively simple manner. The partial descriptions of the embodiments of the display panel can be referred thereto for the relevant aspects.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the present disclosure is defined by the appended claims.

What is claimed is:

1. A display panel comprising:
   a light guide member, a light extraction member, and a modulation member sequentially arranged along a first direction,
   wherein the light extraction member is configured to extract light propagating within the light guide member in a collimated manner to one side of the light extraction member away from the light guide member, the modulation member is configured to modulate a reflectance and transmittance of the light extracted in a collimated manner by the light extraction member within the modulation member, and the modulation member comprises:
   a first electrode layer and a second electrode layer that are oppositely arranged;
   a liquid crystal layer located between the first electrode layer and the second electrode layer;
   a first film layer located on one side of the first electrode layer away from the liquid crystal layer; and
   a second film layer located on one side of the second electrode layer away from the liquid crystal layer;
   wherein the first film layer, the liquid crystal layer, and the second film layer constitute an optical resonant cavity;
   and wherein the display panel further comprises:
   a light source assembly, located on one side of the light guide member along a second direction perpendicular to the first direction, and configured to provide the light guide member with a first polarized light, wherein a vibration direction of the first polarized light is parallel to a deflection plane of liquid crystal molecules of the liquid crystal layer, and the light source assembly comprises:
   a curved reflecting member;
   a monochromatic light source located at a focal point of the curved reflecting member; and
   a first polarizing layer located between the curved reflecting member and the light guide member,
   wherein the curved reflecting member is configured to reflect a first light from the monochromatic light source into the light guide member, and the first polarizing layer is configured to transmit the first polarized light of the first light.

2. The display panel according to claim 1, wherein a material of the first film layer is silver or aluminum, and a material of the second film layer is silver or aluminum.

3. The display panel according to claim 1, wherein the light extraction member comprises:

a light extraction grating adjacent to the light guide member and completely covering a surface of one side of the light guide member adjacent to the light extraction grating.

4. The display panel according to claim 3, wherein the light extraction member comprises:
a first transparent material layer;
wherein the light extraction grating is located within the first transparent material layer; a material of the light extraction grating has a refractive index higher than that of a material of the light guide member, and a material of the first transparent material layer has a refractive index lower than that of the material of the light guide member.

5. The display panel according to claim 4, further comprising:
a second transparent material layer located on one side of the light guide member away from the first transparent material layer and adjacent to the light guide member; and
wherein a material of the second transparent material layer has a refractive index lower than that of the material of the light guide member.

6. The display panel according to claim 3, further comprising:
a light source assembly, located on one side of the light guide member along an extending direction of the light guide member, and configured to provide the light guide member with a first polarized light, wherein a vibration direction of the first polarized light is parallel to a deflection plane of liquid crystal molecules of the liquid crystal layer; and
wherein the light extraction grating is configured to gradually increase a diffraction efficiency from one end adjacent to the light source assembly to one end away from the light source assembly along a second direction which is perpendicular to the first direction.

7. The display panel according to claim 1, wherein a light emitting direction of the display panel is parallel to and in the same direction as the first direction.

8. The display panel according to claim 7, further comprising:
a second polarizing layer, located on one side of the light guide member away from the light extraction member, and configured to transmit a second polarized light of a second light from one side of the second polarizing layer away from the light guide member, and wherein a polarization direction of the second polarized light is perpendicular to a deflection plane of liquid crystal molecules of the liquid crystal layer.

9. The display panel according to claim 8, further comprising:
a substrate located on one side of the modulation member away from the light guide member; and
a color filter layer located on one side of the substrate away from the modulation member.

10. The display panel according to claim 7, wherein the light extraction member comprises a tilted grating.

11. The display panel according to claim 1, wherein a light emitting direction of the display panel is parallel to and opposite to the first direction.

12. The display panel according to claim 11, further comprising:
a third polarizing layer, located on one side of the modulation member away from the light extraction member, and configured to absorb light incident into the third polarizing layer from the modulation member and transmit a second polarized light of a second light from one side of the third polarizing layer away from the light guide member, and wherein a polarization direction of the second polarized light is perpendicular to a deflection plane of liquid crystal molecules of the liquid crystal layer.

13. The display panel according to claim 12, further comprising:
a color filter layer located on one side of the light guide member away from the light extraction member.

14. The display panel according to claim 11, further comprising:
a substrate located on one side of the modulation member away from the light guide member; and
a light absorbing layer, located on one side of the substrate away from the light extraction member, and configured to absorb light incident into the light absorbing layer from the modulation member.

15. A display device comprising the display panel according to claim 1.

16. A driving method for driving the display panel according to claim 1, comprising:
in response to receiving a display signal, modulating the reflectance and transmittance of the light extracted in a collimated manner by the light extraction member within the modulation member by the modulation member, so that the display panel presents a display state corresponding to the display signal.

* * * * *